United States Patent [19]
Shaffer et al.

[11] Patent Number: 5,855,353
[45] Date of Patent: Jan. 5, 1999

[54] VIBRATION DAMPING SYSTEM

[75] Inventors: Roy Shaffer, Granville, Ohio; Kurt G. Melia, Goshen, Ky.

[73] Assignee: Owens Corning Fiberglas Technology, Inc., Summit, Ill.

[21] Appl. No.: 656,658

[22] Filed: May 31, 1996

[51] Int. Cl.⁶ .................................................. F16M 13/00
[52] U.S. Cl. ........................................... 248/638; 428/221
[58] Field of Search ............................ 248/205.3, 205.4, 248/638; 428/411.1, 40.1, 221, 323, 327

[56] References Cited

U.S. PATENT DOCUMENTS

| | | |
|---|---|---|
| 3,693,750 | 9/1972 | Takkunen . |
| 4,168,978 | 9/1979 | Koenig . |
| 4,461,796 | 7/1984 | Fukahori et al. . |
| 4,563,388 | 1/1986 | Bonk et al. . |
| 4,599,257 | 7/1986 | Nutt . |
| 4,777,081 | 10/1988 | Crass et al. . |
| 4,902,546 | 2/1990 | White . |
| 5,149,571 | 9/1992 | Croell . |
| 5,153,042 | 10/1992 | Indrelle . |
| 5,164,245 | 11/1992 | Suzuki . |
| 5,298,694 | 3/1994 | Thompson . |
| 5,300,355 | 4/1994 | Mifune et al. . |
| 5,330,814 | 7/1994 | Fewell . |
| 5,344,116 | 9/1994 | Winkler ................................. 248/638 X |
| 5,460,863 | 10/1995 | Kessel et al. . |
| 5,657,649 | 8/1997 | Lim ....................................... 248/638 X |

OTHER PUBLICATIONS

Pring, Sprong, Rattle, And Whirr., Reduce noise pollution with Polycore, Polycore Pre Finish Metals, 1992, Pre Finish Metals, Inc.

3M Product Information and Performance Data, Scotchdamp Vibration Control Systems (undated).

*Primary Examiner*—Carl D. Friedman
*Assistant Examiner*—Beth A. Aubrey
*Attorney, Agent, or Firm*—C. Michael Gegenheimer; Curtis B. Brueske

[57] ABSTRACT

A method of and apparatus for damping vibration such as sound in a vibration generating device such as an appliance. A constraining layer and an adhering layer are provided. The adhering layer including a viscosity enhancing material such as a cellulose fiber, and an adhesive material. The constraining layer is adhered to a surface of an device with the adhering layer.

27 Claims, 5 Drawing Sheets

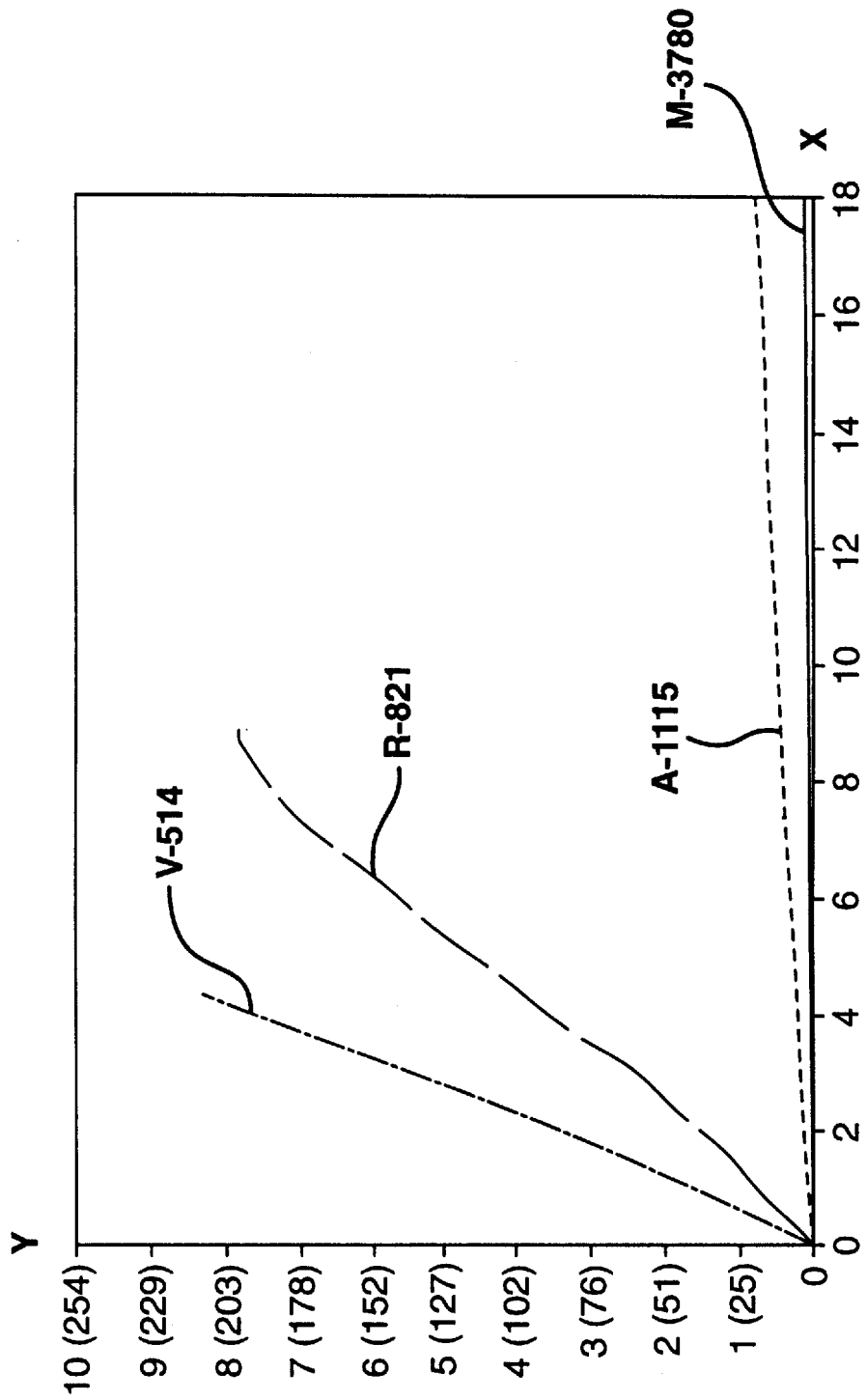

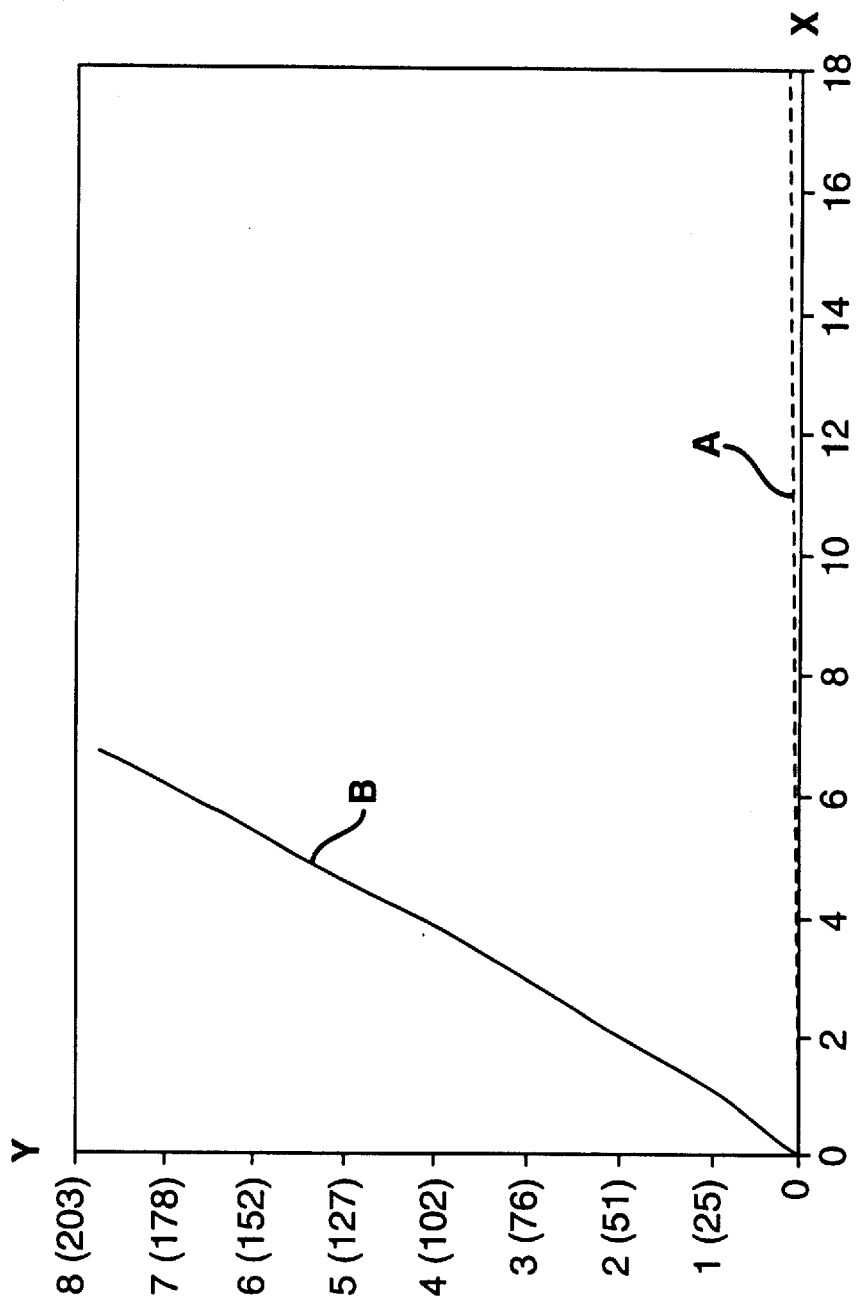

VIBRATION DAMPING SYSTEM

BACKGROUND OF THE INVENTION

1) Field of the Invention

The present relates to a method and apparatus for vibration (e.g., sound) damping and, in particular, a constrained layer damping system with an enhanced resistance to creep, i.e., the slow lateral movement of the constraining layer relative to a surface of the source of vibration.

2) Description of Related Art

The damping of vibration of mechanical systems is of increasing importance to industry in that vibration can have a number of undesirable effects. For instance, consumers are becoming increasingly sensitive to the undesirability of sound created by vibrating systems. Also, vibration can cause electronics, mechanical joints, and fasteners to fail, and can diminish a consumer's perception of quality in a variety of products. For instance, automobile manufacturers have recognized the importance in the purchasing decision of many buyers of a solid thump sound when an automobile door is closed. Likewise, the quality of an appliance is sometimes gauged in part by the perception of the solidity of its construction.

It has become important for the manufacturers of appliances such as clothes washers and dryers, refrigerators, microwave ovens, ovens, stoves, dishwashers, etc. to provide vibration damping on the large, flat sheet material sides of the appliances so that a consumer in making his or her purchasing decision can appreciate the quality of the product by the low frequency sound generated when the side of the appliances is hit. Also, provision of such systems can be important to reduce the noise levels produced by the appliance when such sides vibrate. This is especially true today because of the increase in homes that locate such appliances on the main living floor thereof.

Sound damping systems generally operate by converting vibration energy into thermal energy. For instance, the vibration energy may be converted into thermal energy by interfacial friction, which makes it exhibit a vibration damping property. Alternatively or in addition, shear deformation may be produced within an elastic material having a small elastic modulus when it is located between a source of vibration energy and another surface or constraining layer.

For instance, Pre Finish Metals Inc. provides a product called Polycore® which consists of metal outer skins surrounding a thin, viscoelastic core material. This inner core converts the mechanical energy of vibration into heat and then dissipates the heat. This combination is purported to reduce vibration generated noise at the source.

Similarly, 3M provides products under the name "Scotchdamp™ vibration control systems" in which any one of a variety of adhesive layers joins a constraining layer to a source of vibrating sound. The shear modulus and sound loss factors of these products depend on frequency and temperature, as well as on other factors.

In addition to adhesives, magnetic materials may join a constraining layer to a source of vibratory sound. For instance, in U.S. Pat. No. 5,300,355, the disclosed vibration damping material includes a magnetic composite type damping material constructed by bonding an adhesive elastic sheet containing magnetic powder to a constraining plate such as a metal plate. In this system, it is reported that since not only is the damping material attracted by a magnetic force against a vibration source, it is also provided with a superficial adhesiveness to develop vibration damping properties over a wide range of temperatures.

A fundamental problem with vibration damping systems is that it is possible that the constraining layer becomes separated from the surface of the vibration source. In other words, the constraining layer can fall off during shipping or use. To measure the resistance to this form of mishap, a shock/shear test has been developed wherein an appliance, for instance, is dropped from a certain distance at a certain angle and temperature, the effect of which on the placement of a constraining layer is measured. If the adhesive properties of the adhesive are insufficient, the constraining layer can become dislodged, potentially causing mishaps within the appliance and, at a minimum, eliminating its damping effect or even perhaps increasing the perception of unwanted vibratory sound.

A further problem, however, has been perceived in that the viscoelastic materials have, as one of their properties, a limited fluidity. This property of the adhesive can permit the constraining layer to shift laterally with respect to the surface of the vibrating source, particularly when the constraining layer is vertically positioned relative to the vibration source in use. The slow movement of the constraining layer relative to the vibration source is referred to herein as "creep" and eventually can lead to catastrophic failure in the form of the constraining layer becoming loose, if the creep goes unchecked.

SUMMARY OF THE INVENTION

An object of the present invention is to increase the resistance to creep in vibration damping systems while simultaneously maintaining or increasing the sound damping effect of the constraining layer damping system and maintaining a good resistance to catastrophic failure due to shocks and shearing forces.

The present invention achieves these and other objects by providing a method and apparatus of damping vibration or sound in a vibrating mechanical system such as an appliance comprising the steps and features of providing a constraining layer, providing an adhering layer which includes a viscosity enhancing material and an adhesive material and adhering the constraining layer to a surface of the mechanical system with the adhering layer. The adhering layer can be a composite of an adhesive layer such as a viscoelastic adhesive material with a viscosity enhancing material in the form of, for example, cellulose fibers. Such cellulose fibers can be wetted with an adhesive which penetrates the fiber carrier sheet at least to some degree.

BRIEF DESCRIPTION OF DRAWINGS

The present invention will now be described with reference to the accompanying drawings in which:

FIGS. 3A–3C are graphs showing the creep resistive properties of the present invention against various criteria;

DETAILED DESCRIPTION

Figure 1:
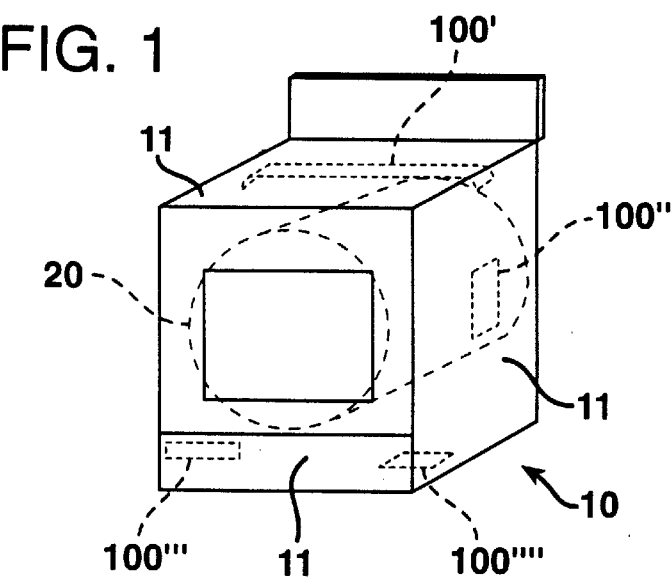
FIG. 1 is an appliance incorporating several embodiments of the vibration damping system of the present invention.

FIG. 1 illustrates but one example of the vibration damping system of the present invention. In FIG. 1, an appliance 10 such as a washing machine or clothes dryer, includes side panels or surfaces 11. In this example, the appliance 10 is a clothes dryer including a drum 20 for holding the clothes through various cycles, though any appliance including means capable of performing a function or work (e.g., washing, drying, cooking, etc.) and capable of producing vibration in reaction to the work or an impact can benefit from the invention.

The panels 11 are typically formed of sheet material such as sheet-metal to which a layer of enamel paint is applied. Left unmodified, these panels 11 tend to vibrate loudly and act as a type of sound generating diaphragm for vibrations developed in the appliance 10 or by objects hitting the surface 11. To at least one of the panels 11 of the appliance 10 is applied a vibration damping system 100 including a constraining layer 12 and an adhering layer 13. The vibration damping system 100 can be applied to one or more surfaces 11, such as to the length of and sightly offset to the center of a top panel (system $100^1$), to the center of one or both side panels (system $100^{11}$) to the toe plate (system $100^{111}$), to the bottom panel (system$^{1111}$), etc. The location of the vibration damping system 100 depends on the configuration of the parts within the appliance 10. One or more systems 100 are placed where sound is generated and where they do not interfere with other parts.

The constraining layer 12 is shown as taking the form of an elongated metal bar or rectilinear plate, but can be shaped as a circular, ovoid, square, irregular, etc. shape as desired. The constraining layer 12 can include an appropriate configuration to assist in stiffening the surface panel 11. Such a stiffening configuration of the constraining layer 12 might be as simple as including bent edges 16 running the length or width of a flat constraining layer 12 (FIG. 2A) or a bend 14 running the length of the constraining layer 12 (FIG. 2C) to provide greater rigidity due to the angled surfaces of the cross-section of the constraining layer 12. Although the bend 14 is shown as chevron shaped, other shapes such as arcuate, rectilinear, etc., shaped may be used if desired.

Figure 2A:
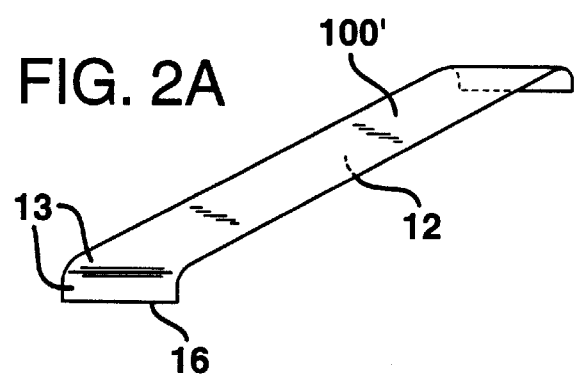
FIG. 2A is a perspective view of a first embodiment of the vibration damping system of the present invention.

Also, the constraining layer can include one or more anti-interference flanges which are designed to prevent the constraining layer 12 from falling into or otherwise interfering with the inner workings of the appliance 10 if the constraining layer is dislodged. As illustrated in FIGS. 1 and 2A, the system $100^1$ adhered to the inside surface of the top panel 11 of the appliance 10 includes bent edges 16 which further operate as anti-interference flanges running the width of the ends thereof. These flanges 16 tend to restrain the system $100^1$ from rubbing against the drum in the event that it becomes dislodged from the top panel 11.

Any suitable material can be used for the constraining layer 12 provided the material has a large elastic modulus at least in one direction compared to the surface 11 to which it is applied. Stated in other terms, the constraining layer 12 should have relatively higher flexural rigidity and thus should resist flexure more than the surface 11 to which it is applied, thereby causing shear forces to develop in the adhering layer 13 to thus convert vibration into heat energy. For instance, the constraining layer 12 may have a large elastic modulus such as a plate made of sheet metal, iron, aluminum, stainless steel, copper, etc., a plastic plate made of phenol resin, polyamide, polycarbonite, polyester, etc., a fiber reinforced plastic plate fabricated by reinforcing the plastic plate using fiber such as glass fiber, carbon fiber, etc., or an inorganic rigid plate such as slate plate, hydrated calcium silicate plate, a plaster board, a fiber mixed cement plate, a ceramic plate, etc., or an organic rigid plate including asphalt, fiber impregnated with asphalt, wood, etc.

The vibration damping system 100 can be positioned either on the inside or the outside of the appliance 10. If exposed to casual observation, the constraining layer 12 can include a layer of paint and non-functional configurations or profiles for aesthetic purposes.

Figure 2B:
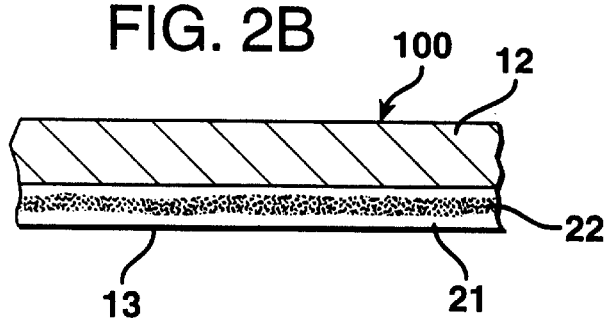
FIG. 2B is a cross-sectional view of the vibration damping system of FIG. 2A.
Figure 2C:
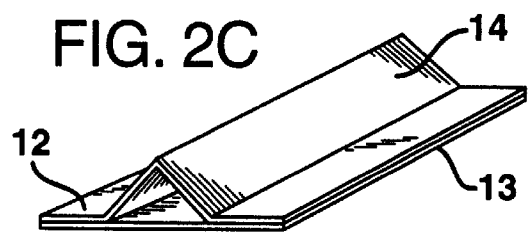
FIG. 2C is a perspective view of a second embodiment of the vibration damping system of the present invention.

As shown in FIGS. 2A and 2B, the adhering layer 13 is interposed between the constraining layer 12 and the source of vibration such as the panel 11, such that it acts both to adhere the constraining layer 12 to the panel 11 and damp the vibration of the panel 11. The adhering layer 13 is composed of a viscosity enhancing material 21 and an adhesive 22, as shown in FIG. 2B. The viscosity enhancing material 21 enhances the viscosity of the adhesive and thereby creep resistance, but also reinforces the adhesive and thereby increases the adhesive's resistance to shock and shearing forces.

The adhesive 22 is preferably a viscoelastic material which converts vibration into heat energy by shear forces developed within the viscoelastic material. Any suitable viscoelastic adhesive material can be used if it remains viscous after curing. For instance, the adhesive can be any one or more of the following adhesives: a pressure sensitive hot or cold melt adhesive, an acrylic based adhesive such as acrylic viscoelastic polymers, pressure sensitive damping polymers, adhesive epoxy resins, urea resins, melamine resins, phenol resins, vinyl acetates, cyanoacrylates, urethanes, synthetic rubbers, etc. The adhesive can be, for example, any one of a variety of commercial adhesives such as the acrylic adhesive A-1115 from Avery-Dennison, the acrylic adhesive MACtac™ XD-3780 from Morgan Adhesives, the synthetic rubber based hot melt adhesive R-821 from The Reynolds Co., or the acrylic adhesive V-514 from Venture Tape. The performance of these commercially available adhesives is shown in FIG. 3A.

FIG. 3A graphically represents an adhesive performance comparison with respect to inches of creep in a damping system using a cellulose material 21 after allowing for a 60 minute wet out time at 75° F., where a 150 gram weight was applied to the constraining layer 12 at 125° F. on painted metal panels over a period of hours.

The viscosity enhancing material 21 of the adhering layer 13 generally reduces the fluidity of the resulting adhesive layer, thereby generally reducing the amount of both static and dynamic creep exhibited within the vibration damping system. The viscosity enhancing material 21 may include one or more of the following exemplary materials: organic fibers including cellulose, carbon fiber, asbestos, and inorganic fibers including glass fiber, steel wool, synthetic fibers, etc.

The viscosity enhancing material 21 provides a structure interposed between the vibration generating source such as the side surface panel 11 of an appliance 10 and the constraining layer 12. This structure permits side surface panel 11 and the constraining layer 12 to move relative to one another within confines but increases the viscosity (i.e., resistance to flow) of the adhering layer 13 so that permanent shifts between the constraining layer 12 and the side surface panel 11 are reduced. In other words, the constraining layer 12 in general does not creep relative to the side surface panel 11 as much as in an identical damping system that doesn't include the viscosity enhancing material 21.

This advantage of the present invention is shown in FIG. 3B, which demonstrates that the viscosity enhancing material, namely cellulose fiber (a paper-like product), greatly increases the damping system's resistance to creep of the constraining layer (see line A) compared to a substantially similar system (e.g., a system including the same MACtac™ XD-3780 adhesive, the same surface 11 and the same constraining layer 12 with a 150 gram weight applied 90 to the surface plane at 125° F.) but without an additive such as a viscosity enhancing material (see line B). As can be seen, with the viscosity enhancing material, creep is reduced to a relatively negligible amount, whereas, without the viscosity enhancing material, creep leads to bond failure within hours.

In a preferred embodiment, the viscosity enhancing material 21 of the adhering layer 13 is a cellulose material, the fibers of which are dimensioned and matted to permit penetration of the adhesive in its liquid state into the cellulose carrier material, which may be accomplished by soaking the cellulose material in the adhesive, by pressurized extrusion, by rolling, or by any other suitable method. The penetration can be within microns or throughout the cellulose material.

The adhering layer 13 is produced by applying an adhesive 22 in a liquid state to the viscosity enhancing material 21 and curing the adhesive 22 to form an adhesive coated core. A number of processes can be used to apply the adhesive 22 to the viscosity enhancing material 21 or to carrier materials. For instance, a roll coat process (metered adhesive liquid is applied to one or both of two or more opposing rollers between which a core, e.g., the viscosity enhancing material, passes), spray coating, brush coating, knife coating, foam (stable bubbles) or froth (the bubbles of which dissipate to leave a thin coat) coating in the form of applying mechanically or chemically agitated adhesives, curtain coating, slot die or extruded coating (with the carrier or viscosity enhancing material passing through a slot in which adhesives are injected), or calendaring, for example.

Figure 4:
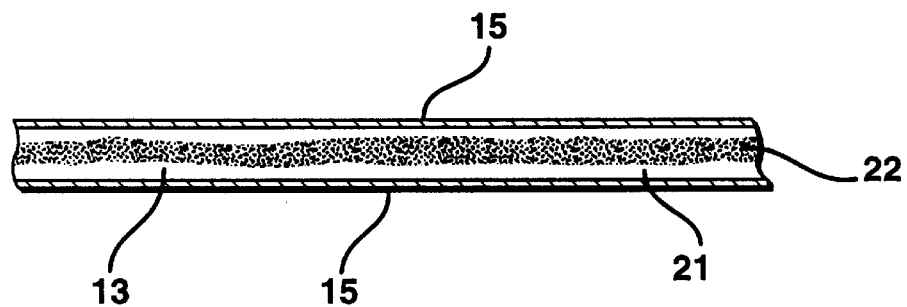
FIG. 4 is a cross-sectional view of the adhesive layer of FIG. 2B having release films applied to major surfaces thereof.

As shown in FIG. 4, appropriate release films 15 may be formed or placed on the major surfaces (top and bottom) of the adhesive coated core or adhering layer 13 in a known fashion.

The inventive method includes providing a constraining layer 12, providing an adhering layer 13 including a viscosity enhancing material 21 and an adhesive 22, and adhering the constraining layer 12 to the surface of the appliance with the adhering layer 13. To apply the constraining layer 12 to the appliance, a first release film 15 is (if present) removed to expose an adhesive coated surface of the adhering layer 13, the adhering layer 13 is applied to the constraining layer 12 with some application of pressure, and a second release film 15 (if present) is removed to expose the opposite adhesive coated surface of the adhering layer 13, and the opposite surface of the adhering layer 13 is applied to the side surface panel 11 of the appliance 10 with some pressure. Alternatively, the adhering layer 13 can be applied to the side surface panel 11 initially and the constraining layer 12 applied to the opposing surface of the adhering layer 13 thereafter.

Figure 3C:
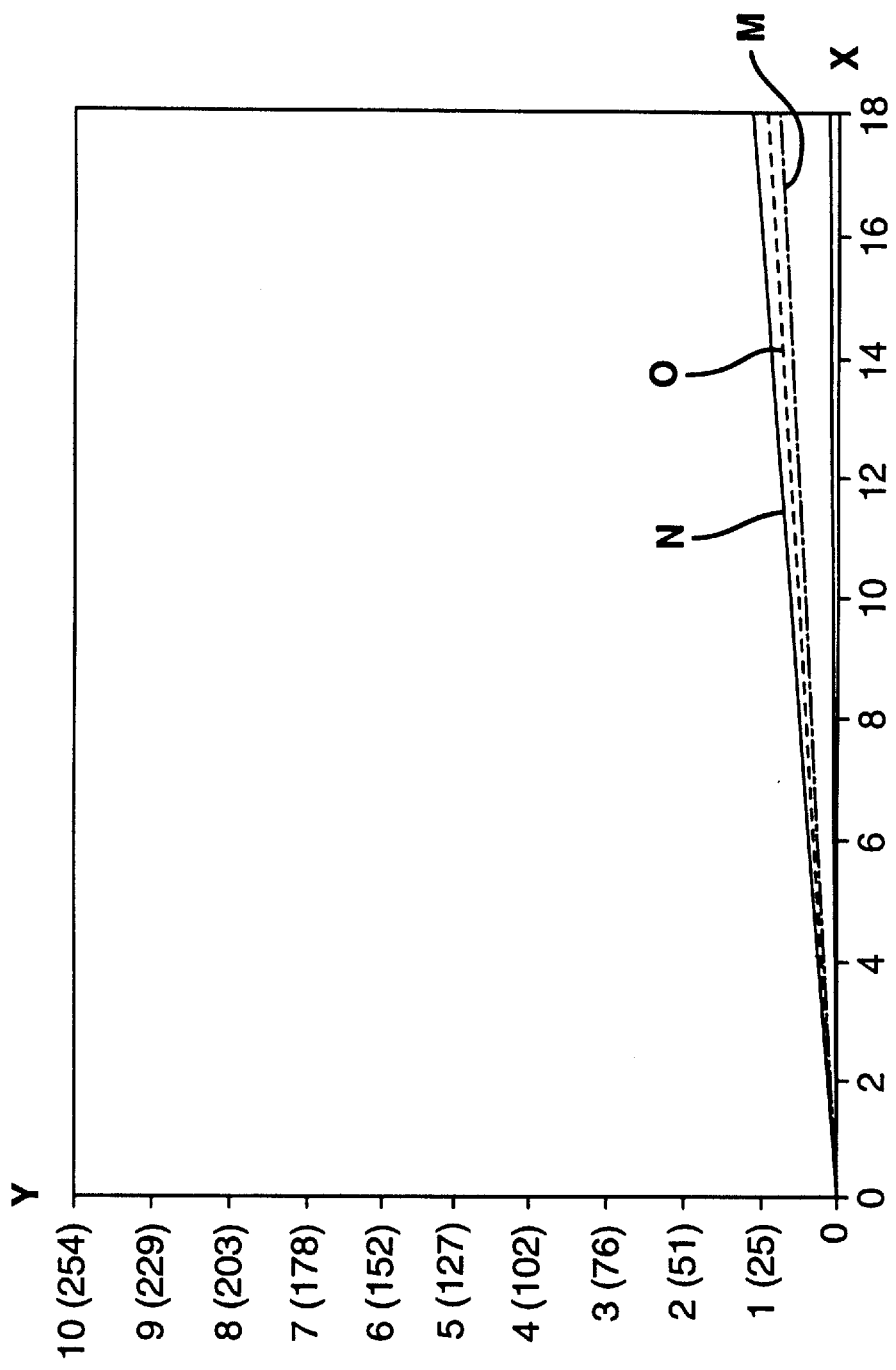

The actual application of the damping system 100 to the panel 11 can include using a roller or a hand to apply pressure on the constraining layer 12, the adhering layer 13, or the panel 11 on one side with the adhesive layer 11 on the other and pinched against a hard surface. The various processes should not make a significant difference to the creep resistance of the adhering layer 13. For example, as shown in FIG. 3C using Avery-1115 adhesive, the amount of pressure (e.g. 2.1 lbs, 4.5 lbs, or 8.2 lbs on a standard roller in accordance with the Pressure Sensitive Tape Counsel guidelines) does not make an appreciable difference on creep resistance within normal confines and conditions.

Figure 5:
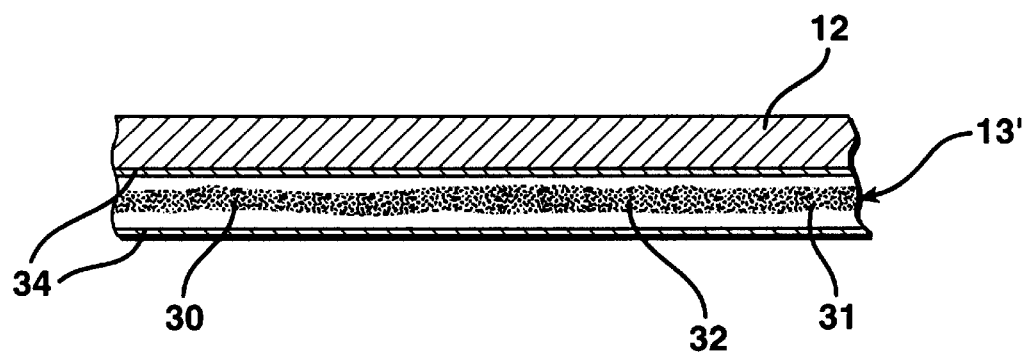
FIG. 5 is a cross-sectional view of a third embodiment of the vibration damping system of the present invention.

In another embodiment of the present invention, shown in FIG. 5, the adhering layer 13' includes two or more sublayers, including one or more damping layers 30 composed of a viscosity enhancing material 31 and a viscoelastic damping material 32, and one or more adhesive layers 34 composed of an adhesive material. The viscoelastic damping material 32 may be any suitable viscoelastic material, such as a polymer, asphalt, etc., and the viscosity enhancing and adhesive materials may be any suitable materials, such as those disclosed hereinabove. In such an embodiment where creep is a concern, however, it is preferable that the adhesive material be relatively viscous and thus resistant to creep, such that the adhering function of the adhering layer 13 is performed mostly by the adhesive layers 34, and the damping function of the adhering layer 13 is performed mostly by the damping layer 30. It should be understood that it is contemplated that the adhering layer 13' may include various arrangements of damping layers and adhesive layers other than the arrangement shown in FIG. 5, to meet specific design criteria for a particular use of the vibration damping system 100.

The present invention has been described by way of preferred embodiments. However, the invention is not limited to those preferred embodiments. For instance, the present invention is applicable to any vibrating system which requires damping on any surface. For instance, the present invention can have application for damping vibration in the panels of automobile doors, trunks, hoods, etc. and aeronautical applications. Application of the invention to such electronic devices as housings for computers or other vibration sensitive equipment is also envisioned. The present invention can be applied anywhere vibration or sound damping is appropriate, particularly where the vibration damping element is applied to a horizontal or vertical surface or subjected to any force which might cause a slow shift in the relative position of the damping element (creep) that may or may not lead to catastrophic failure of the adhesive bond.

In light of the foregoing, various modifications and alterations of this invention will become apparent to those skilled in the art without departing from the scope and spirit of the invention. It should be understood that the invention is not to be unduly limited to the illustrative embodiments as set forth herein. Instead, the metes and bounds of the present invention is set forth in the appended claims.

We claim:

1. A method of damping vibration in a vibration producing device, comprising the steps of:
    providing a constraining layer;
    providing an adhering layer, said adhering layer including a fibrous carrier material and a viscous adhesive material applied to said fibrous carrier material, said fibrous carrier material enhancing said viscosity of said adhesive material; and
    adhering said constraining layer to a surface of said vibration producing device with said adhering layer.

2. A method in accordance with claim 1, wherein said constraining layer includes a material which resists flexure more than said surface.

3. A method in accordance with claim 1, wherein said fibrous carrier material of said adhering layer includes at least one of the following materials: organic fibers including cellulose, carbon fiber, and inorganic fibers including glass fiber, steel wool, synthetic fibers, asbestos.

4. A method in accordance with claim 1, wherein said fibrous carrier material of said adhering layer is a cellulose material, fibers of which permit penetration of said adhesive material when said adhesive material is in a liquid state.

5. A method in accordance with claim 1, wherein said adhering layer is a viscoelastic material which converts vibration into heat energy.

6. A method in accordance with claim 1, wherein said adhesive material includes at least one of the following materials: a pressure sensitive hot melt adhesive, an acrylic based adhesive such as acrylic viscoelastic polymers, pressure sensitive damping polymers, adhesive epoxy resins, urea resins, melamine resins, phenol resins, vinyl acetates, cyanoacrylates, urethanes, and synthetic rubbers.

7. A method in accordance with claim 1, wherein said adhering layer demonstrates a resistance to creep of less than one inch of movement in ten hours when 150 grams or less of constant force is applied at 125° F.

8. A method in accordance with claim 1, wherein said step of providing said adhering layer includes applying said adhesive material in a liquid state to said fibrous carrier material and allowing said adhesive to cure.

9. A method in accordance with claim 1, wherein said step of providing an adhesive layer includes applying a release film to the major surfaces of said adhesive layer and wherein said adhering step includes removing said release film to expose said adhesive coated core.

10. A method in accordance with claim 1, wherein said adhering layer is provided between said vibration producing device and said constraining layer such that at least one side of said constraining layer is exposed and wherein said step of adhering includes adhering said constraining layer to an exposed surface of a side of said vibration producing device, said constraining layer including a coating of paint on at least one said exposed side of said constraining layer.

11. A method in accordance with claim 1, wherein said step of adhering includes providing said adhering layer between said constraining layer and an inside surface of a side of said vibration producing device to adhere said constraining layer thereto.

12. A method in accordance with claim 1, wherein said vibration producing device is an appliance.

13. An appliance comprising:
means for performing work;
at least one surface producing sound in response to vibration; and
a vibration damping system, including a constraining layer, and an adhering layer, said adhering layer including a fibrous carrier material and a viscous adhesive material applied to said carrier material, wherein said carrier material enhances said viscosity of said adhesive layer and wherein said constraining layer is adhered to said at least one surface by said adhering layer.

14. An appliance in accordance with claim 13, wherein said constraining layer includes a material which resists flexure more than said at least one surface.

15. An appliance in accordance with claim 13, wherein said fibrous carrier material of said adhering layer includes at least one of the following materials: organic fibers including cellulose, carbon fiber, and inorganic fibers including glass fiber, steel wool, synthetic fibers, or asbestos.

16. An appliance in accordance with claim 13, wherein said fibrous carrier material of said adhering layer is a cellulose material, fibers of which permit penetration of an adhesive when the adhesive is in a liquid state.

17. An appliance in accordance with claim 13, wherein said adhering layer is a viscoelastic material which converts vibration into heat energy.

18. A method for reducing creep in a sound damper system including a constraining layer and an adhering layer adhering said constraining layer to a surface of a vibration producing device, comprising the step of:
forming said adhering layer by applying a viscous adhesive material to a fibrous carrier material such that the viscosity of said viscous adhesive material is enhanced.

19. A method in accordance with claim 18, wherein said fibrous carrier material of said adhering layer includes at least one of the following materials: organic fibers including cellulose, carbon fiber, and inorganic fibers including glass fiber, steel wool, synthetic fibers, or asbestos.

20. A method in accordance with claim 18, wherein said fibrous carrier material of said adhering layer is a cellulose material, fibers of which permit penetration of said adhesive material when said adhesive material is in a liquid state.

21. A vibration damping system comprising:
a constraining layer;
an adhering layer, said adhering layer including a fibrous carrier material and a viscous adhesive material applied thereto, said fibrous carrier material enhancing the viscosity of said adhesive material.

22. A vibration damping system in accordance with claim 21, wherein said constraining layer includes a material which resists flexure more than a surface to which it is to be applied.

23. A vibration damping system in accordance with claim 21, wherein said fibrous carrier material of said adhering layer includes at least one of the following materials: organic fibers including cellulose, carbon fiber, and inorganic fibers including glass fiber, steel wool, synthetic fibers, or asbestos.

24. A vibration damping system in accordance with claim 21, wherein said fibrous carrier material of said adhering layer is a cellulose material, fibers of which permit penetration of said adhesive material when said adhesive material is in a liquid state.

25. A vibration damping system in accordance with claim 21, wherein said adhering layer is a viscoelastic material which converts vibration into heat energy.

26. A vibration damping system in accordance with claim 21, wherein said adhering layer includes at least one damping layer containing said fibrous carrier material, and at least one adhesive layer including said adhesive material.

27. A vibration damping system comprising:
a constraining layer; and
an adhering layer having an adhesive material and a core of one of foam and plastic, wherein said adhesive material coats said core.

* * * * *